United States Patent
Lund

(10) Patent No.: US 8,983,873 B2
(45) Date of Patent: Mar. 17, 2015

(54) SYSTEM FOR SECURE PAYMENT OVER A WIRELESS COMMUNICATION NETWORK

(75) Inventor: Stefan Lund, Bollebygd (SE)

(73) Assignee: iZettle Merchant Services AB, Stockholm (SE)

( * ) Notice: Subject to any disclaimer, the term of this patent is extended or adjusted under 35 U.S.C. 154(b) by 269 days.

(21) Appl. No.: 13/808,986

(22) PCT Filed: Oct. 26, 2010

(86) PCT No.: PCT/EP2010/066186
§ 371 (c)(1),
(2), (4) Date: Mar. 15, 2013

(87) PCT Pub. No.: WO2012/003892
PCT Pub. Date: Jan. 12, 2012

(65) Prior Publication Data
US 2013/0173475 A1   Jul. 4, 2013

Related U.S. Application Data

(60) Provisional application No. 61/362,912, filed on Jul. 9, 2010.

(51) Int. Cl.
*G06Q 20/00* (2012.01)
*G06Q 20/40* (2012.01)
(Continued)

(52) U.S. Cl.
CPC .............. *G06Q 20/409* (2013.01); *G06Q 20/20* (2013.01); *G06Q 20/32* (2013.01); *G06Q 20/341* (2013.01);
(Continued)

(58) Field of Classification Search
CPC ..... G06Q 20/32; G06Q 20/341; G06Q 20/20; G06Q 20/322; G06Q 20/3278; G06Q 20/325; G06Q 20/204; G06Q 20/105; G06Q 20/3226; G06Q 20/409; G06Q 20/3227; G06Q 20/353; G06Q 20/34; G06Q 20/3415; G06Q 20/347; G06Q 20/382; G06Q 20/3829
See application file for complete search history.

(56) References Cited

U.S. PATENT DOCUMENTS 6,098,053 A   8/2000  Slater
7,003,316 B1  2/2006  Elias et al.
(Continued)

FOREIGN PATENT DOCUMENTS

EP    1213691    6/2002
EP    1553518    7/2005
EP    1710758    10/2006

OTHER PUBLICATIONS

International Search Report and Written Opinion from corresponding International Application No. PCT/EP2010/066186, dated Mar. 4, 2011.

(Continued)

*Primary Examiner* — Calvin L Hewitt, II
*Assistant Examiner* — Mohammad A Nilforoush
(74) *Attorney, Agent, or Firm* — Renner, Otto, Boisselle & Sklar, LLP

(57) ABSTRACT

A method of conducting secure electronic credit payments to a payment acquirer using a credit payment unit, comprising of a smart card, a portable card reader device and a mobile phone, and a payment server. The method is based on using a unique reader key in the card reader device to encrypt all the sensitive smart card information communicated to the payment server, and thus being able to use an unsecure mobile phone to communicate with the payment server. The payment server then completes the transaction with the payment acquirer over a secure line.

11 Claims, 8 Drawing Sheets

(51) Int. Cl.
*G06Q 20/20* (2012.01)
*G06Q 20/32* (2012.01)
*G06Q 20/34* (2012.01)
*G06Q 20/38* (2012.01)
*G07F 7/08* (2006.01)
*G07F 7/10* (2006.01)

(52) U.S. Cl.
CPC ........ *G06Q 20/3823* (2013.01); *G06Q 20/3825* (2013.01); *G07F 7/0886* (2013.01); *G07F 7/1008* (2013.01); *G07F 7/1033* (2013.01); *G07F 7/1075* (2013.01); *G07F 7/1091* (2013.01); *G06Q 20/4012* (2013.01)
USPC ................................ 705/67; 705/64; 235/380

(56) References Cited

U.S. PATENT DOCUMENTS

| | | | |
|---|---|---|---|
| 7,424,732 B2* | 9/2008 | Matsumoto et al. | 726/2 |
| 8,447,991 B2* | 5/2013 | Hart et al. | 713/185 |
| 2004/0058705 A1 | 3/2004 | Morgan et al. | |
| 2004/0104268 A1 | 6/2004 | Bailey | |
| 2006/0049255 A1 | 3/2006 | Von Mueller et al. | |
| 2008/0179401 A1 | 7/2008 | Hart et al. | |
| 2008/0189214 A1 | 8/2008 | Von Mueller et al. | |
| 2010/0138666 A1 | 6/2010 | Adams et al. | |

OTHER PUBLICATIONS

International Preliminary Report on Patentability from corresponding International Application No. PCT/EP2010/066186, dated Oct. 1, 2011.

Kurokawa Makoto et al., "Development of EMV Level2 Middleware Implementing IC Credit System", Business Innovation/Products and Technologies, Mar. 2006, NEC Technical Journal, vol. 1, No. Jan. 2006, pp. 63-66, [retrieved online Aug. 18, 2014], <http://www.nec.com/en/global/techrep/journal/g06/n01/pdf/t060114.pdf>.

European Search Report from corresponding European Application No. 14166368, mailed on May 28, 2014.

* cited by examiner

SYSTEM FOR SECURE PAYMENT OVER A WIRELESS COMMUNICATION NETWORK

TECHNICAL FIELD

The invention relates in general to the field of secure electronic credit transactions, and more particularly, to a method and a system for secure credit card payments via the Internet using a portable card reader device, and a mobile device, such as a mobile phone.

BACKGROUND

Every day an incredible number of credit card payments are made around the world, and the number of payments are steadily increasing. The majority of credit card payments are either made in stores using a point-of-sale (POS) terminal where you insert or swipe your credit card and identify yourself with a personal identification number (PIN), or on the Internet using a computer where you enter your credit card details and in some cases also a security code. However, using your credit card to make payments in a POS terminal or on the Internet comes with a risk of having your credit card information hijacked and abused. In recent years there have been several reports of false or tampered with POS terminals used in restaurants and in shops where the customer's credit card information has been hijacked. Credit card information theft on the Internet is often accomplished using everything from advanced eavesdropping programs to fake websites designed to look legit, but with the sole purpose of hijacking your credit card information. Another drawback with the today's credit card payment systems is that it is almost impossible to make a direct person-to-person payment.

A much safer and easier way to make payments would be to own your own POS terminal which you could make all your transactions with. Unfortunately, a POS terminal is very expensive to purchase and use and you have to pay a fee for each transaction, it is also too bulky to carry around with you, so in reality only a place of business can afford owning one. Thus, a way to make safe credit card payments in stores, on Internet and person-to-person which is inexpensive, easy to manage and portable is highly sought after.

SUMMARY OF THE INVENTION

With the above description in mind, then, an aspect of the present invention is to provide a way for a private person or companies to easily and securely perform secure credit card payments which seek to mitigate, alleviate, or eliminate one or more of the above-identified deficiencies in the art and disadvantages singly or in any combination.

As will be described in more detail by the aspects of the present invention below, one way for a private person or a company to easily and securely perform secure credit card payments is to use a portable card reader device together with a mobile phone communicating with a payment server according to the aspects of the present invention below.

A first aspect of the present invention relates to a method of conducting electronic credit payments to a payment acquirer using a credit payment unit, comprising a smart card, card reader device and a mobile phone, and a payment server, wherein said method comprising initializing said credit payment unit by establishing communication between said smart card and said card reader device, and establishing communication between said card reader device and said mobile phone, establishing communication between said credit payment unit and said payment server using said mobile phone, communicating a reader serial number stored in said card reader device via said mobile phone to said payment server, deriving a reader key, used in said card reader device for encrypting information, in said payment server based on said communicated reader serial number and a master reader key stored in said payment server, reading, in said card reader device, smart card information from said smart card, and encrypting said smart card information using said reader key, receiving user inputted payment details and a user inputted signature in said mobile phone, communicating, using said mobile phone, said encrypted smart card information from said card reader device, said payment details and said signature to said payment server, decrypting and verifying said smart card information in said payment server, and communicating said payment details from said payment server to said payment acquirer, and thereby completing an electronic credit payment.

The method wherein said communication between said smart card and said card reader device may further be encrypted using said reader key in said card reader device.

The method wherein said communication between said credit payment unit and said payment server using said mobile phone may further be encrypted using the Transport Layer Security protocol or the Secure Sockets Layer protocol.

The method wherein said user inputted signature may further be a graphical image of said user's signature entered on a display on said mobile phone.

The method wherein said communicating of said payment details from said payment server to said payment acquirer may further be encrypted.

The method may further comprise receiving, in said payment server, an acknowledgement from said payment acquirer that said electronic credit payment has been completed.

The method may further comprise generating a receipt of said electronic credit payment in said payment server, communicating said receipt to said credit payment unit and displaying said receipt in said mobile phone.

The method may further comprise storing said receipt and said signature in a log.

The method wherein said electronic credit payment may further comply with an EMV payment system specification.

A second aspect of the present invention relates to a credit payment unit adapted to communicate with a payment server for making electronic credit payments, comprising a smart card containing smart card information, a card reader device containing a unique reader serial number and a unique reader key, wherein said card reader device is adapted to read said smart card information and to encrypt said smart card information using said reader key; and a mobile phone adapted to communicate with said payment server, wherein said mobile phone is further adapted to read said reader serial number and said encrypted smart card information, wherein said mobile phone is further adapted to receive user inputted payment details and a user inputted signature, and wherein said mobile phone is further adapted to communicate said reader serial number, encrypted smart card information, payment details and signature to said payment server for completing a secure credit payment.

The credit payment unit wherein said mobile phone may further be adapted to receive a receipt from said payment server and to display said receipt a display in said mobile phone.

The credit payment unit wherein said mobile phone may further be adapted to receive said inputted payment details via a touch sensitive display.

A third aspect of the present invention relates to a system for conducting electronic credit payments to a payment acquirer using a credit payment unit according to the above second aspect of the present invention, and wherein the system adapted to perform the method above according to the first aspect of the present invention.

BRIEF DESCRIPTION OF THE DRAWINGS

Further objects, features, and advantages of the present invention will appear from the following detailed description of some embodiments of the invention, wherein some embodiments of the invention will be described in more detail with reference to the accompanying drawings, in which.

DETAILED DESCRIPTION

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout.

Embodiments of the present invention will be exemplified using a mobile communication device such as a mobile phone. However, it should be appreciated that the invention is as such equally applicable to electronic devices which have wired- and/or wireless radio communication capabilities. Examples of such devices may for instance be any type of mobile phone, laptops (such as standard, ultra portables, netbooks, and micro laptops), handheld computers, PDAs, gaming devices, accessories to mobile phones, etc. However, for the sake of clarity and simplicity, the embodiments outlined in this specification are exemplified with and related to mobile phones only.

Figure 1A:
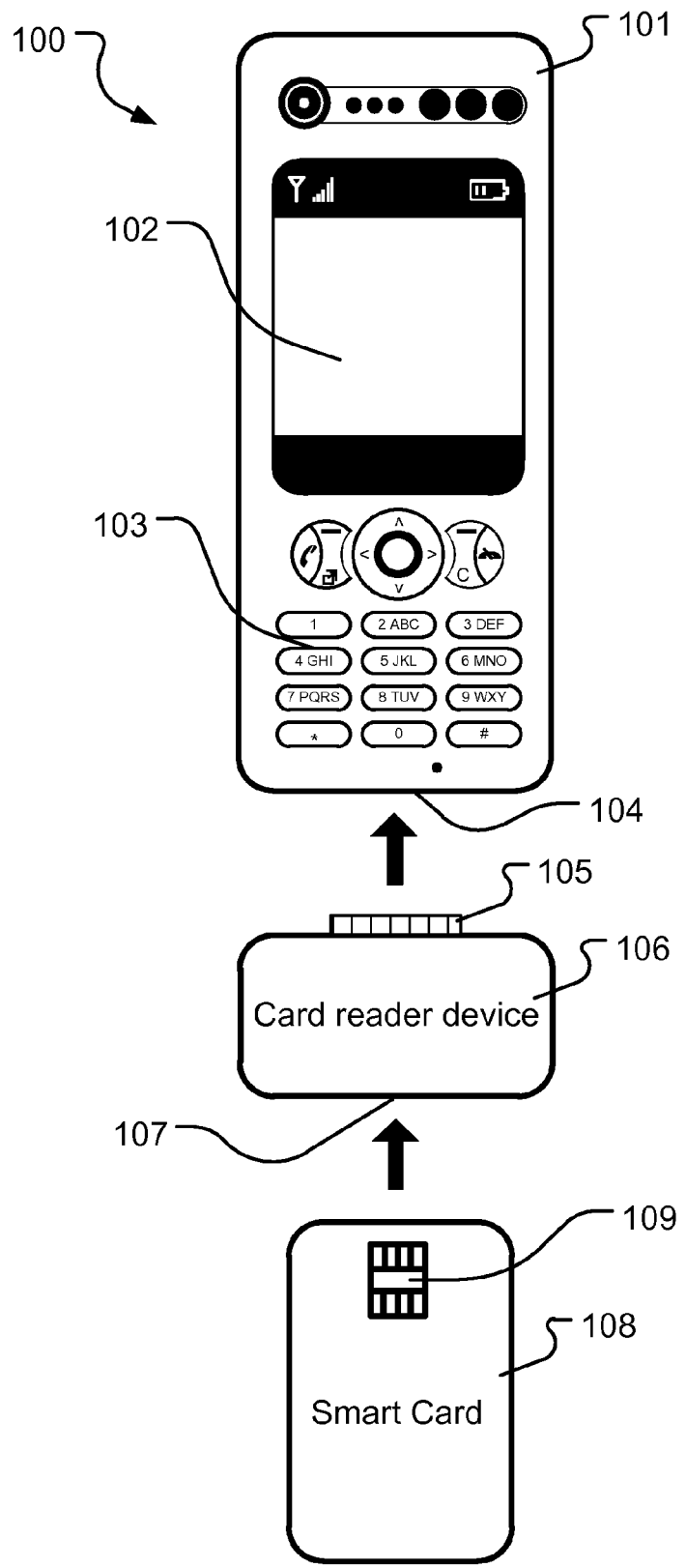
FIG. 1a shows a smart card, a card reader device and a mobile phone which can be assembled into a unit capable of making secure credit payments.

FIG. 1a shows the individual parts that, in an embodiment of the present invention, together form a device 100, from hereinafter referred to as a secure credit payment unit, which makes up a small portable terminal that can be used for making secure smart card credit payments over a wireless communication network. The first part is a mobile phone 101 comprising a casing, a display area 102, and means 103 for navigating among items displayed in the display area 102 and entering text and numbers into the mobile phone. The display area 102, which preferably is touch sensitive, may comprise one or more status indication areas and/or softkey bars. The display area 102, and the items displayed on it, may be operable using the navigation means 103 or by tapping the on it with a pen-like object or a finger. The mobile phone 101 may also comprise other elements normally present in such devices such as; a speaker, a microphone, a camera, a photo sensor (e.g. ambient light), a infrared light (IR) sensor, infrared light emitting diode (IR LED), processing means, memory means, one or more accelerometers, a vibration device, an AM/FM radio transmitter and receiver, a digital audio broadcast transmitter and receiver, a GPS device, a Bluetooth device, a WiFi device, a near field communication device, an antenna module, and a communication interface 104 for external units. External units connected to the mobile phone 101 via the communication interface 104 may either be controlled by applications running in the mobile phone and/or use resources in the mobile phone (such as the transceiver) at its own discretion without the need or involvement of any mediatory applications in the mobile phone.

The second part of the secure credit payment unit 100 is a card reader device 106. The card reader device 106 may be equipped with an interface 105 for connecting to another device such as a mobile phone 101. The interface may be a typical communication interface (e.g. connector for iPhone) used in the mobile communication industry, or it may be a special interface used in conjunction with embodiments of the present invention. The card reader device 106 may be connected to the mobile phone 101 directly, using its communication interface 105, by being physically plugged into the mobile phone corresponding communication interface 104, or it could be connected via an adapter between the mobile phone's 101 communication interface 104 and the communication interface 105 of the card reader device 106. The card reader device may also in some variants of the embodiment be connected to the mobile phone 101 using a wire.

The card reader device may comprise a smart card reader slot 107 where a smart card may fully (completely), or in part (only a part of), be inserted into. The smart card reader slot 107 may or may not be fitted with a protective hatch.

The card reader device 106 may in a variant of the embodiment also comprise a common magnetic stripe reader with a reader slit, through which a credit card may be slided to be read.

The card reader device 106 may comprise all or some of; a card reader for reading and/or writing information on a microchip embedded on a smart card and/or reading and/or writing information on a magnetic stripe on a credit card, special hardware units for decryption/encryption of the information read and written to and from the microchip and the magnetic stripe, hardware and software for communicating with external devices such as a mobile phone, and/or hardware and software performing decryption and encryption of all incoming and outgoing communication with external units. The encryption/decryption performed by the card reader device 106 fulfills all the requirements of world-wide standards of security of online transfer of credit card details The card reader device 106 may in a variant of the embodiment also comprise a touch sensitive screen where a user may enter information such as his or hers signature, PIN code, writing gestures, and/or other personal identification information. The card reader device 106 may also be fitted with other input devices or sensors capable of registering biometric data such as reading fingerprints, scanning a retina, recording and analyzing a person's voice, recording and analyzing a person's facial features, detecting movement patterns in 3-dimensions, detecting a person's writing rhythm, and detecting a person's dynamic signature.

The card reader device 106 may also be made tamper proof so that the circuits and the software inside the card reader device is destroyed beyond recovery if the card reader device is disassembled in any way with or without force.

The third part of the secure credit payment unit 100 is a smart card 108. A smart card, a chip card, or an integrated circuit card is defined to be any type of pocket-sized or credit card-sized card with an embedded integrated circuit or an embedded microchip 109. Smart cards 108 often comprise microprocessor components and a volatile or non-volatile memory or both, and can hold information (such as credit card information, card number, personal details regarding the card holder, account number or numbers, payment server addresses, etc.) and are programmed to perform certain specific operations and/or to execute applications stored in its memory. A smart card 108 may also provide strong security authentication for single sign-on and may include specialized cryptographic hardware that uses algorithms such as triple DES, RSA and DSA. A smart card is generally capable of containing more information than a magnetic stripe card and it may be prepared and programmed for different tasks. Some cards can contain programming and data to support multiple applications and some can be updated to add new applications after they are issued. Smart cards can be designed to be inserted into a smart card slot 107 and read by a card reader device 106, or to be read at a distance using near field communication techniques. We will not go into any further detail regarding the construction or functionality of smart cards since it is not crucial for understanding the different embodiments, and their variants, of the present invention. However, in-depth information may for instance be obtained from the smart card standard ISO 7816.

Figure 1B:
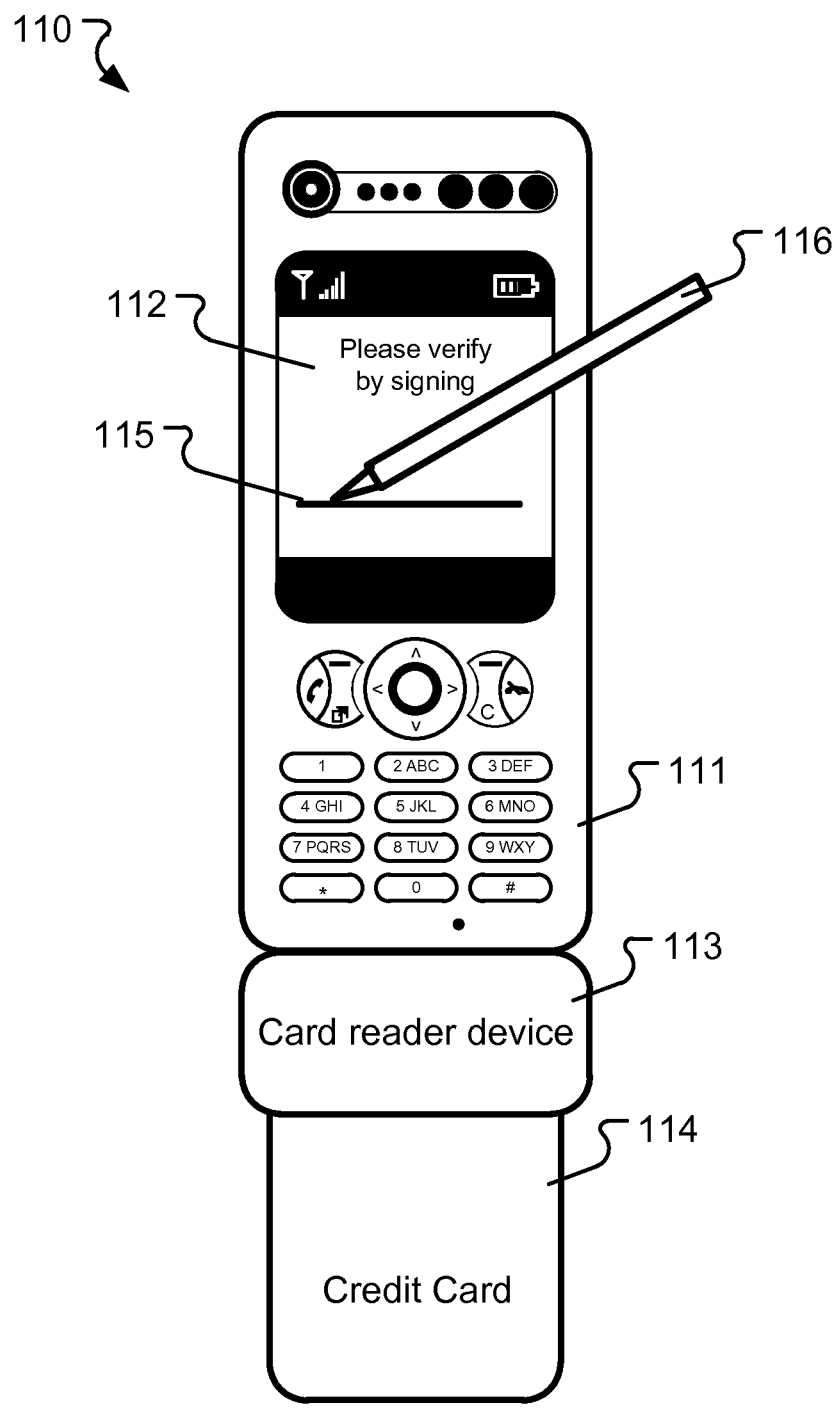
FIG. 1b shows a secure credit payment unit, comprising a mobile phone, a card reader and a smart card, assembled and ready to make credit payments with, according to an embodiment of the present invention.

The three parts, the mobile phone 101, the card reader device 106 and the smart card 108, in FIG. 1a may be put together to form a secure credit payment unit 110 as shown in FIG. 1b. The communication interface of the card reader device 113 may be physically pushed into the mobile phone 111 and the smart card 114 may then be inserted into the card slot on the card reader device 113, thus forming a single unit 110 capable of making secure credit payments.

In an embodiment of the present invention, the mobile phone 111 only acts as a transceiver and does not contain or process any information to or from the card reader device 113. In a variant the mobile phone may have software that processes some of the information from the card reader device 106 and/or a remote party such as a server communicating with the mobile phone 101. However, the mobile phone 111 can in a variant be used to obtain identification information from the user using the secure credit payment unit 110. An example of identification information that can be obtained may for instance be the user's signature written with a pen 116 (or the like) on the touch sensitive display area 112 of the mobile phone 111. The user could also be prompted to input (e.g. draw on the touch sensitive screen) certain patterns, entering username and password, address, place of birth, social security number or similar information. Biometric information (such as appearance, voice, fingerprint, etc.) may in an embodiment also be inputted via the mobile phone and used singularly or together with the user's signature to identify the user.

Figure 1C:
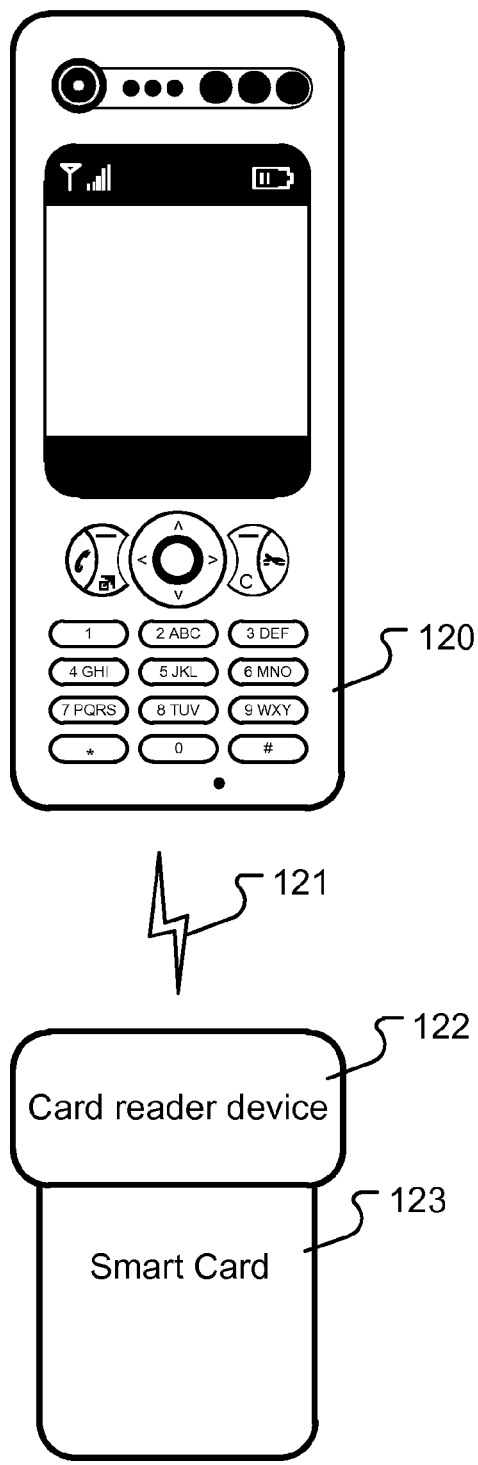
FIG. 1c shows a secure credit payment unit, comprising a mobile phone, a card reader and a smart card, assembled and ready to make credit payments with, wherein the card reader device is communicating wirelessly with the mobile phone, according to an embodiment of the present invention.

FIG. 1c shows a variant of a secure credit payment unit where the card reader device 122 is not physically connected to the mobile phone 120. In this variant the smart card 123 is inserted into the card slot of the card reader device 122 which communicates via a wireless link 121 (or optionally via a wire) with the mobile phone 120. The wireless communication 121 between the card reader device 122 and the mobile phone 120 may in a variant of the embodiment be encrypted, using standard encryption algorithms, to eliminate ant eavesdropping.

Figure 1D:
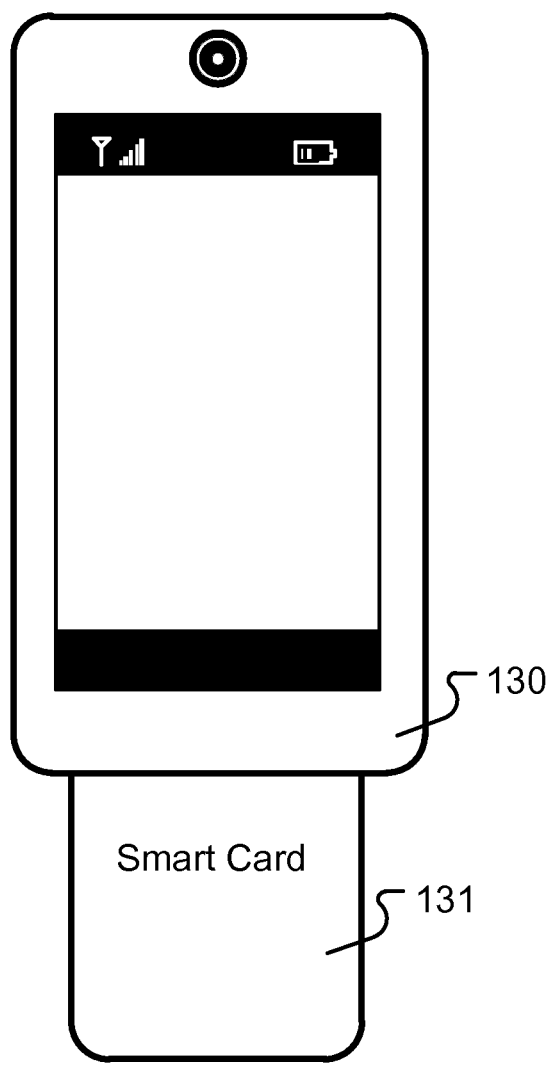
FIG. 1d shows a dedicated card reader device, such as for instance a mobile phone, ready to make credit payments with, according to an embodiment of the present invention.

FIG. 1d shows yet another variant of a secure credit payment unit where the card reader device is either built into the mobile phone 130 (in this case a touch type mobile phone) and the smart card 131 is inserted directly into the mobile phone 130, or the mobile phone 130 has a standard built in card reader and hardware and/or software inside the mobile phone 130 performs, together with the standard card reader, the card reader device functions.

Figure 1E:
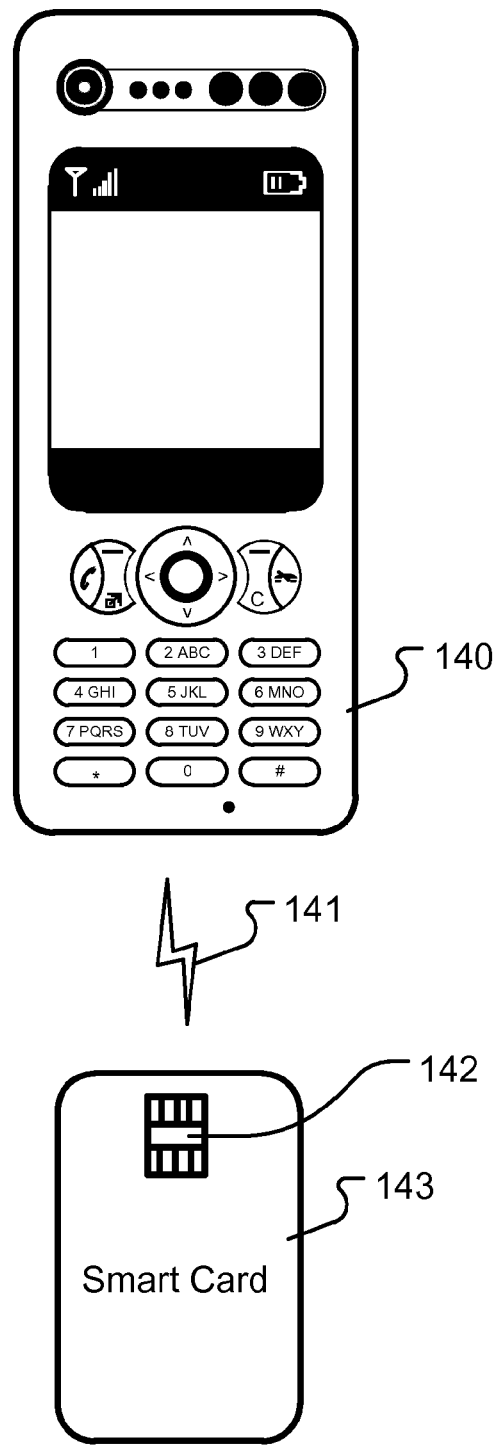
FIG. 1e shows a secure credit payment unit, comprising a mobile phone and a smart card, ready to make credit payments with, wherein the wireless card reader device inside the mobile phone is communicating wirelessly with the smart card, according to an embodiment of the present invention.

FIG. 1e shows yet another variant of a secure credit payment unit where the card reader device is built into the mobile phone 140 and mobile phone communicates with the microchip 142 on the smart card 143 via a wireless link 141. The wireless communication between the microchip 142 and the mobile phone 140 may or may not be encrypted. In yet another embodiment the microchip 142 may communicate wireless 141 with a card reader device (not shown) plugged into the mobile phone 140.

Figure 2:
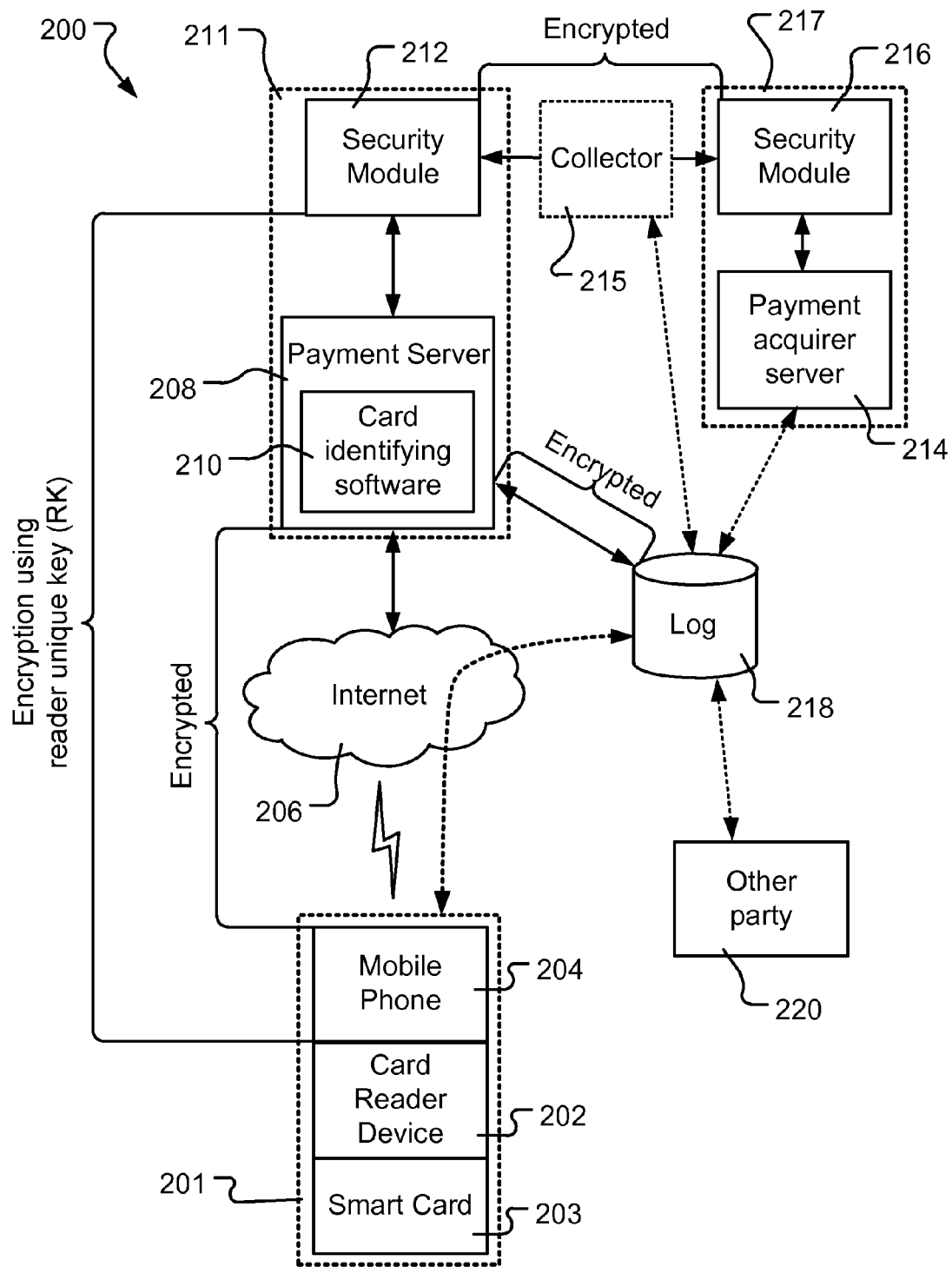
FIG. 2 shows a schematic of a secure credit payment system, according to an embodiment of the present invention.

FIG. 2 shows a block diagram of a system for making secure credit payment 200 using a secure credit payment unit 201 comprising a mobile phone 204, a card reader device 202, and a smart card, as described in detail in conjunction with FIGS. 1a to 1e.

The card reader device 202 has been programmed (in hardware or in software, or both) with a unique card reader device key (hereinafter referred to as a reader key, RK) and a unique reader serial number (hereinafter referred to as reader serial number, RSN) at the time of manufacture or after the manufactured by the card issuer. As discussed in conjunction with FIG. 1a, the card reader device 202 can been made tamper proof so that it is impossible to gain illegal access to the RK without destroying the card reader device.

A payment procedure may be initiated by activating the card reader device 202 by plugging it into the mobile device 204 and thereby starting, automatically or manually, a dedicated software application in the mobile device 204. The payment procedure may in a variant be initiated by entering a smart card into the card reader device 202 which has already been plugged into the mobile phone 204. The software application, when started, will then setup the communication between the mobile phone 204 and the card reader 202, and in a variant also with the smart card 203.

The mobile phone 204 then establishes communication with a payment server 208, which could be owned and maintained by any of; the credit card issuer, the card reader device manufacturer (if not the same company), a card reader device owner company, or a bank. The communication between the mobile phone 204 and the payment server 208 is encrypted using for instance standard encryption protocols such as the Transport Layer Security (TLS), the Secure Sockets Layer (SSL) or some other suitable encryption method.

When secure communication have been established between the mobile phone 204 and the payment server 208 (using TLS, SSL or some other encryption method), the card reader device 202 transmits its unique RSN either in plain text, or encrypted (by the card reader device) if enhanced security is needed, via the mobile phone 204 now acting only as a gateway or transceiver relaying information between the card reader device 202 and the payment server 208. At the payment server 208, a card identifying software application 210 derives, in cooperation with a security module 212, the card reader device's unique RK based on the received RSN and a Reader Master Key (RMK) stored in the security module 212 (which could be realized either in hardware or in software or both). In this way the payment server is able to decrypt RK encrypted information sent from the card reader device during the payment process. The RMK may be issued by the card manufacturer, the card reader device manufacturer or the card reader device owner company. The security module 212 may either be included as a unit in the payment server 208 (as illustrated by the dotted box 211 enclosing both the security module 212 and the payment server 208) or it could be a standalone server 212 communicating with the payment server using encryption.

When the RK is derived an acknowledgement may or may not be sent to the credit payment unit 201. All information exchanged between the card reader device 202 and the payment server 211 and/or the security module 212 is then encrypted using the RK. In this way no sensitive information coming from the card reader device (or the payment server 208 and/or the security module 212) can be accessed or revealed by the mobile phone 204 or any third party eavesdropping on the communication between 206 the mobile phone 204 and the security module 212 (i.e. the wired or wireless communication over a network such as the Internet 206) since it is encrypted using the RK. In this way an ordinary and unsecure mobile phone can be used to perform a secure credit payment transaction without jeopardizing any sensitive card information.

The information transmitted wirelessly and over the Internet 206 from the card reader device 202 is both encrypted with the RK and a standard encryption protocol, such as TSL or SSL, used in the communication between the mobile phone 204 and the payment server 208. However, the information entered into the mobile phone 204 and communicated to the payment server 211 is only encrypted using a standard encryption protocol, such as TSL, SSL or any other suitable encryption protocol.

When a card holder want to make a payment, the smart card information stored on the smart card 203 (in a memory in the smart card's microchip) is read and processed by the card reader device 202. This processing may or may not include decryption (and/or encryption) of the communicated information between the smart card 203 and the card reader device 202.

In an embodiment of the present invention the card holder is then asked to enter payment details which for instance could be details about the recipient of the payment, the amount to pay, personal details (such as address, social security number, place of birth, etc.), which account to draw money from, if a receipt and/or an acknowledgment of the transaction is wanted or not, etc. Then the card holder is asked to sign the transaction by writing his or hers signature on the touch sensitive screen of the mobile phone (or the card reader device). Payment information containing the RK encrypted smart card information, the graphical signature and the payment details is then sent, using a standard encryption protocol such as TSL or SSL, together with the RK encrypted information from the smart card 203, from the card reader device 202 to the payment server 208.

In a variant, biometric information has to be entered together with or instead of the signature into the mobile phone 204 or the card reader device 202.

The payment server 208 and the security module 212 then decrypt the RK encrypted smart card information in the received payment information and the card identification software in the payment server identifies the smart card information, the payment details and the card holder's graphical signature. In this way the payment server 211 can verify that the payment information is connected to a legit and valid smart card 203. The payment details and/or the card holder's graphical signature may then be communicated, via the security module 212, to a payment acquirer server 214 via a security module 216. In the same manner as with the payment server 208 and security module 212, the security module 216 and the payment acquirer server 214 may either be realized as stand-alone units or incorporated in the same server (as illustrated by the dotted box 217 enclosing both the security module 216 and the payment acquirer 214). When the payment acquirer server 214 has received the payment details, and/or the card holder's graphical signature, and accepted it, a message may be sent to the payment server 211 where a payment receipt may be generated and sent to the mobile phone 204 to alert the user of that the transactions has been completed. The message may contain information about the completion of the transaction and/or the card holder's graphical signature. The payment receipt may also be stored in a log 218 together (or not) with the card holder's graphical signature. In a variant the payment receipt may instead be generated in the payment acquirer server 214 and sent to the payment server 208 which relays it to a log 218 (together or not with the card holder's graphical signature) and also to the mobile phone 204 to alert the user of that the transactions has been completed.

The payment acquirer server 217 is usually owned by a bank, a credit company or a credit institute who is administrating the account of the person or company the payment is made to.

The communication between the security modules 212 and 216 is usually encrypted using some standard strong encryption method.

An optional collector 215 may be situated between the payment server 211 and the payment acquirer server 217. A typical collector 215 could for instance be a bank, a credit company or a credit institute handling payment transactions for either the user making the payment or the payment acquirer who is receiving the payment. The collector 215 may then authorize all transactions and payment instructions between the two servers 211, 217. The communication between the servers 211 and 217 is usually encrypted using some standard strong encryption method.

A log or database 218 saves all, or some (depending on local laws and regulations), of the transactions made in the secure credit payment system 200 either together or not with the card holder's graphical signature.

In an embodiment of the present invention the payment server 208 is in charge of saving and utilizing transaction information made in the secure credit payment system 200 in the log 218. The server with the log on may either be placed in the vicinity of the payment server 211 (in a variant it may be incorporated into the payment server 211) or it may be placed in another geographical location. The communication between the log 218 and the payment server 208 is preferably encrypted using some standard strong encryption method.

Optionally, hence the dotted lines, other servers 215, 217 or parties 204, 220 may be authorized to store and/or to access log information stored in the log 218. For instance the user making the payment may have access to later, via the Internet 206, access the log 218 and view receipts of previous transactions.

The information in the log 218 may in some variants be used for tracking shopping behavior and provide offers to the user based on recent type of purchases. It may also be used for additional security by for instance being capable of providing an alarm, by combining the log data with the GPS, cell-ID or WiFi-positioning output from the mobile device, when payments are made from certain geographical locations or when the purchase behavior changes. It could also be a plug-in application used for accounting purposes by another party 220 such as a company, providing comprehensive output directly into a balance sheet.

All communication with the log 218 may either be encrypted or not encrypted depending on which type of information that is going to be communicated.

All user-interaction in the payment procedure may either take place on the touch screen display of the card reader device 206 (or alternatively on a touch sensitive display on the card reader device 202). The user may enter payment details need in the payment process via the keyboard of the mobile phone and/or the touch sensitive screen on the mobile phone 204. It is completely safe to use the mobile phone to enter and to receive information about the payment process since all sensitive smart card information is encrypted by the RK.

The wireless data communication over the Internet 206 may be enabled by using GSM, UMTS, CDMA, WiFi or any other communication standard suitable for transmission of data to a mobile communication terminal. The communication may also be a mixture of wirelessly and wire communication wherein a base station receives the wireless transmission and relays it via wire using the traditional wired Internet infrastructure.

Figure 3:
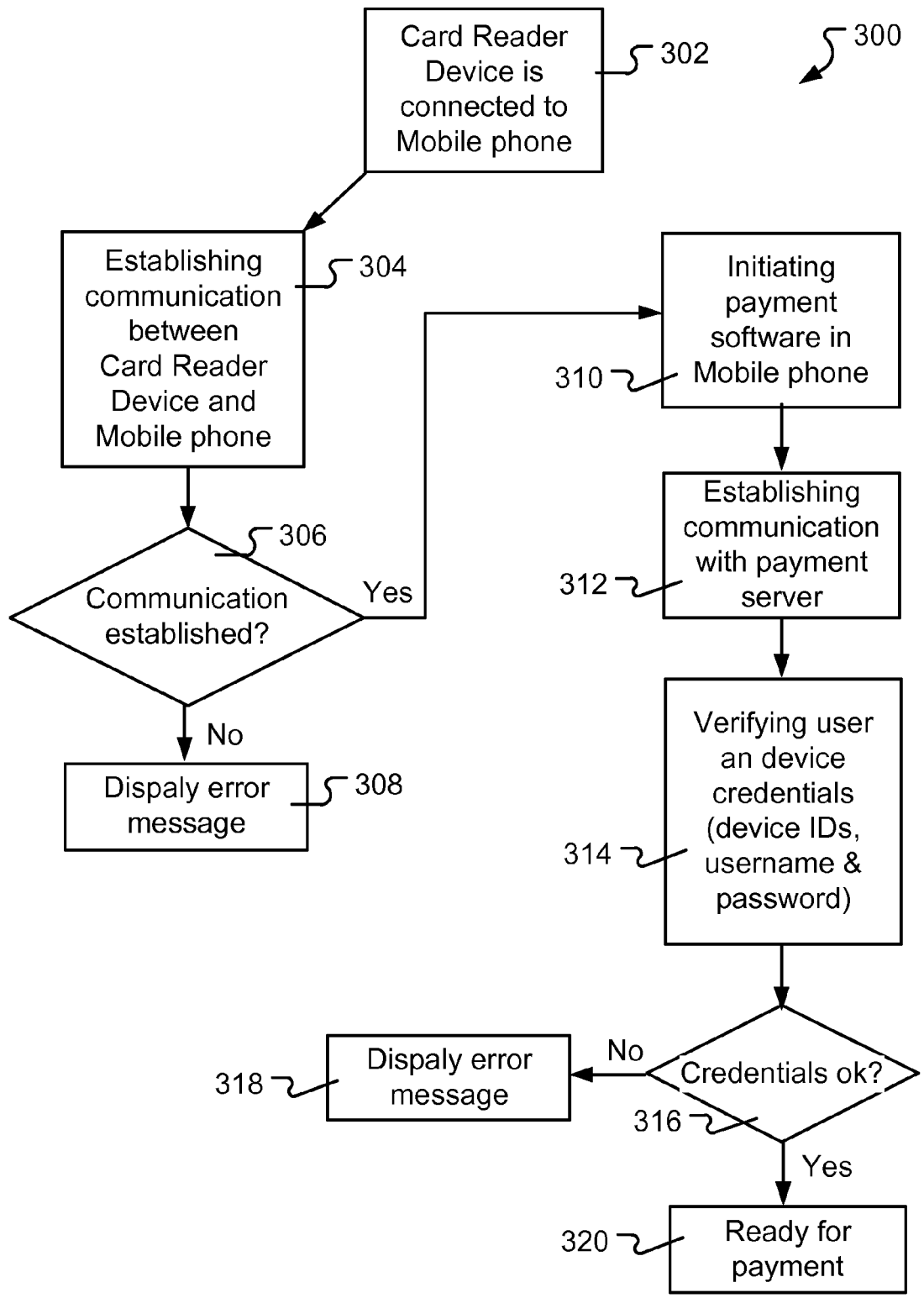
FIG. 3 shows a flowchart of the setup process of the hardware and software of the credit payment system, according to an embodiment of the present invention.

FIG. 3 shows a flowchart 300 describing the setup process of the secure credit payment unit in more detail. The setup process is initiated 302 when the card reader device is connected (wirelessly or by wire) to the mobile phone. Optionally the payment process is initiated 302 when a smart card is placed in the card reader device (already connected to the mobile phone). In the next step 304, communication between the card reader device and the mobile device is established (i.e. determining how to communicate with each other). The card reader and the mobile device detect each other and determines if and how the devices may securely communicate with each other. If communication between the card reader device and the mobile device is feasible, a communication between the devices may be established 306. If a communication can't be established 306 due to incompatibilities, faults or for security reasons an error message 308 is communicated to the user operating the secure credit payment unit.

When communication has been established between the card reader device and the mobile phone 304, the payment software in the mobile phone is initiated and begins setting up the communication with the card reader device and also establishing communication with a payment server 312 via a wireless or wired link. Which payment server that the communication shall be established with may be determined by the user from a list of trusted servers, or it may be preset in the hardware or firmware of the card reader device, or in may be preset in the payment software installed in the mobile phone, or it may be extracted from the memory of the microchip of the smart card. When establishing communication with the payment server the unique RSN is transmitted to the payment server. The payment server then derives the unique RK which is used throughout (as described in detail in conjunction with FIG. 2) the payment process to guaranty that sensitive smart card information in the payment process is safe and secure. If the RK can't be derived or if the RSN is faulty or black listed an error message 308 is communicated to the user operating the secure credit payment unit.

In a variant the necessary payment software is, during the establishing of the communication between the card reader device and the mobile device 304, downloaded (from the card reader device or from an external server such as the payment server) and executed and/or installed in the mobile device.

When communication has been established with the payment server 312 the user of the secure credit payment unit must identify him or herself. The identification process 314 may be in the form of entering his or hers signature on the touch sensitive display of the mobile phone, entering user name and password in the payment software running in the mobile device or may be in the form of identifying biometric data (eye/retina information via the mobile devices camera, voice recognition via the mobile devices microphone, or fingerprint identification via an built in fingerprint reader in the mobile device or in the card reader device). The collected credentials in 314 may, in a variant of the present invention, be verified by the payment server when communication with the payment server has been established.

If the credentials checks out 316 the unit is ready for performing a secure credit payment, and the startup process is completed. If the credentials do not check out 316 an error message 318 is communicated to the user operating the secure credit payment unit. The user may then be prompted to enter its credentials again, and if the signature, username or password does not check out, and/or if the user is "black-listed" at the payment server a "payment permission denied message" may be communicated to the user.

Figure 4:
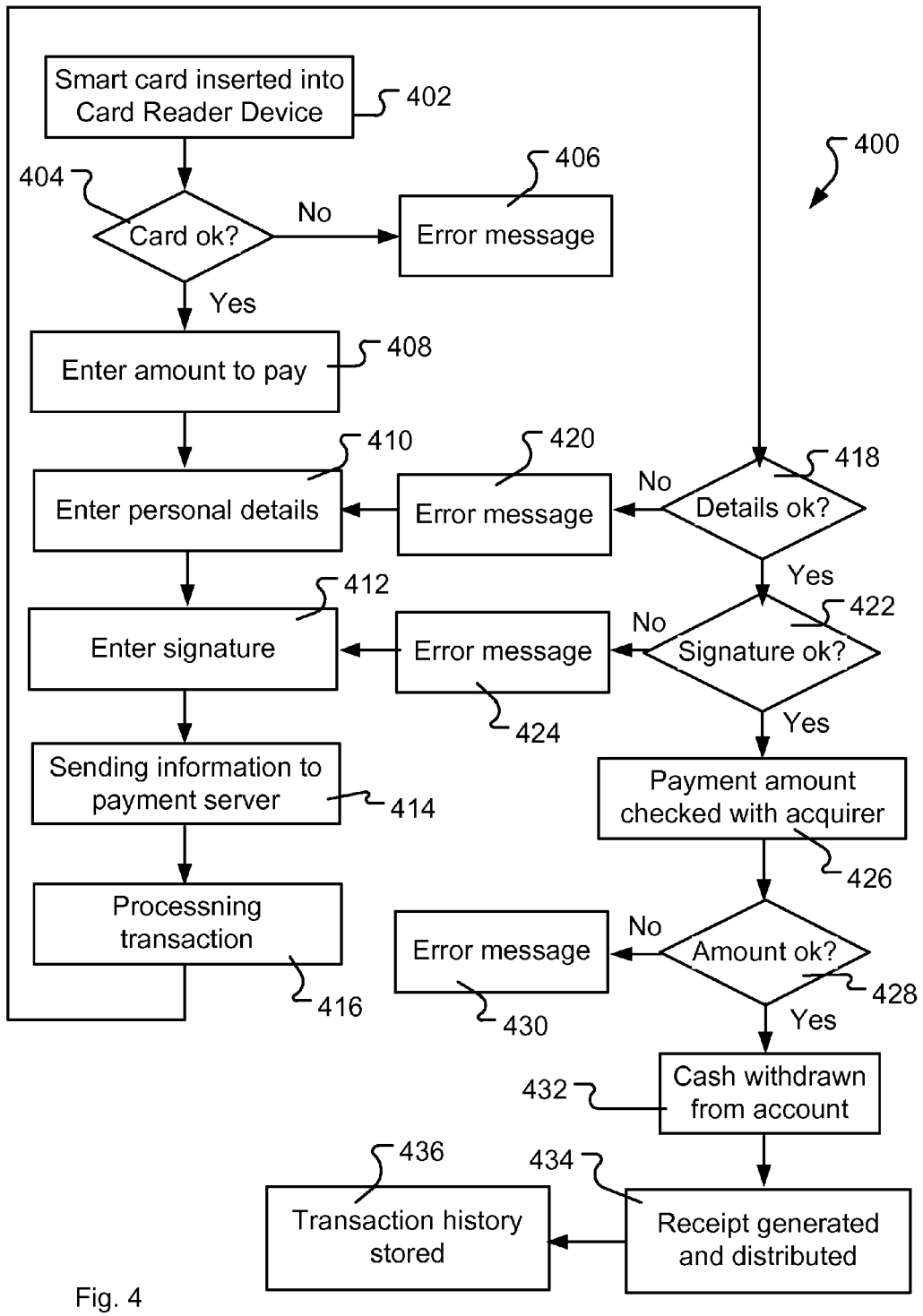
FIG. 4 shows a flowchart of the secure credit payments process, according to an embodiment of the present invention.

FIG. 4 shows a flowchart 400 describing the process of performing a secure credit payment. A secure credit payment may be initialized after the setup process of the secure credit payment unit described in the flowchart 300 in FIG. 3 have been successfully completed. Alternatively the secure credit payment may be initialized at the same time as the setup process of the secure credit payment system (for instance during one, some or all of the steps 310 to 320) as described in the flowchart 300 in FIG. 3 is executed.

The secure credit payment is a credit transaction between two parties namely user 1 who is going to receive payment and user 2 who is going to pay user 1. In some cases several users may be involved in the payment procedure, but in the example below illustrating the present invention only the case where two parties are involved in the transaction is described in detail. However, a person skilled in the art can easily see that the secure credit card payment process may be extended to include several parties as well. A user may either be private person, legal person or transaction equipment belonging to a private person or a legal person.

The secure credit payment process 400 is initiated when user 2, who is going to pay user 1, inserts a smart card in the card reader device. The card reader device accesses and reads the microchip containing smart card information such as card number, account number, or any other identification and/or credit card information.

The card reader device will then start to communicate with the payment server to verify the smart card information. If the smart card information is not cleared by the payment server 404, an error message 406 is presented to user 2 (and/or to user 1 if available). If the smart card information is cleared by the payment server then user 2 is prompted to enter, into the mobile phones payment software, the amount 408 that is going to be transferred to the payment acquirer server, which in this case would be the server managing user 1's bank account.

User 2 will then be prompted to enter his or hers personal details 410 related to the purchase. Personal details may be one or several of; his or hers address, telephone number, alias, email address, personal number (social security number), or other personal identification number. Alternatively, the required information could be stored in the card reader device, the mobile device or on the server and automatically (or when requested by the user) filled in.

User 2 will then be prompted to enter his or hers signature 412 or some kind of card verification code to approve the payment order. This is the same procedure as when a person signs the paper slip when making a payment using a POS terminal. The approved information is then communicated to the payment server 414 (or alternatively to the payment acquirer server) for verification and processing of the transaction 416.

The entered personal details 408 may be verified and approved 418 by either the payment server or the payment acquirer server. If the personal details are not approved 418, then user 2 will be prompted with an error message 420 and returned to the "enter personal details" 410 step in the process, or optionally, the secure credit card payment process 400 will be terminated.

If the personal details are approved 418, the next step is to verify and approved 422 the entered signature 412. This is done either by the payment server or the payment acquirer server. If the signature is not approved 422, user 2 will be prompted with an error message 424 and returned to the "enter signature" 412 step in the process, or optionally, to the "enter personal details" step 410, or in yet another variant, the secure credit card payment process 400 may be terminated. In a variant only the existence of a signature is verified and stored on the payment server or on in a transaction log for future verification needs.

When the credentials of user 2 have been verified, the amount to be paid is sent to the payment acquirer server from the payment server. The payment could also be sent from a legal person or a server instructed by the payment server to execute the payment.

The paid amount is verified 428 by the payment acquirer and/or the payment server. If the paid amount is too low and/or too high, user 2 will be prompted by an error message 430 and optionally returned to the "enter amount" step 408. If the paid amount is ok 428, the amount is withdrawn from user 2's smart card or user 2's bank account (optionally connected to the credit card) by the payment acquirer server or the payment server. The paid amount is transferred by the payment acquirer server to user 1 based on account input provided by the payment server and/or user 2 to the payment acquirer server.

In the next step 434 a receipt is generated and distributed to one or several of; user 1, user 2, payment acquirer server or a payment server. The receipt may be distributed via for instance SMS, email, published on a web site or alternatively via regular mail, based on the input of details in 410 and/or on account settings/information stored at the payment server. Optionally, the receipt is stored on a server in a log, with or without the signature 412, which different parties may have access to and are able to view the receipt on and/or download it.

The transaction information may be stored in a log file, with or without the signature 412, containing transaction history where information such as the amount transferred, from who to whom, time of transaction, type of credit card used, photo of the buyer and/or seller, the location on which the transaction was completed, hardware ID of the mobile device, unique serial key from the card reader device, and other identifying information may be stored.

The information that is transferred in 414 to the payment server may be fully or partially encrypted using the RK and transferred over the Internet via a wireless or a wire connection. The information could also be communicated over a proprietary dial up connection, directly to the payment server where the dial up connection uses standard secure communication protocols.

The information stored from the transaction in 436 may alternatively be used to provide cash withdrawal lists that can be sent to user 1 via regular mail, or alternatively via email or text messages.

The information stored from the transaction in 436 may alternatively be used to present purchase information on a web page where the users or a third party can login using the username and password used in the payment software in the mobile device.

Some of the steps shown in the flowcharts in FIGS. 3 and 4 may be omitted or rearranged in different embodiments of the present invention. Also, additional blocks further clarifying the processes discussed in conjunction with FIGS. 3 and 4 may be inserted into the flowchart to better describe embodiments of the present invention.

The present invention, as described above, can be applied to existing payment systems on the market without having to change, modify or circumvent the payment systems specifications. An example of a payment system in which the present invention may be applied is the EMV payment system. EMV is a payment system specification for smart cards that was jointly developed by the companies Europay International, Mastercard International, and Visa International, hence the name. One of the purposes with EMV was to create a more secure payment system that the traditional magnetic-stripe credit card payment system. The EMV specification has two security levels, EMV Level 1 and EMV Level 2.

EMV Level 1 covers the electrical and physical interfaces, and the transmission of data between the terminal and the card. EMV Level 2 covers the set of functions that provide all the necessary processing logic and data that is required to process a smart card application in order to perform an EMV transaction. A POS terminal must go through an extensive EMVCo (http://www.emvco.com) defined level 1 and level 2 approval processes, which require that every terminal goes through a laboratory type testing and approval before they can be used for EMV transactions. This is one of the factors which make POS terminals very expensive to own for a private person and very bulky in its design (due to the tampering proof security measures). EMVCo also require that the approval is renewed at defined intervals to retain compliance. For more information regarding the EMV specification, the reader is referred to EMV 2000 Books from EMVCo.

EMV approved POS terminals on the market today performs both EMV Level 1 and Level 2 security measures in the POS terminal. By applying the present invention to the EMV standard, EMV Level 1 and Level 2 can be separated and still maintain the same, or a higher, security standard. For example in FIG. 2 EMV Level 1 security measures are fulfilled in the card reader device while EMV Level 2 security measures are fulfilled in the payment server. In this way it becomes possible to make a small and cost effective card reader device, which is approved by the EMVCo, which can be used together with an ordinary mobile phone, which doesn't need to be approved by the EMVCo since it only acts as a transceiver for information. In this way the present invention makes it possible to manufacture a small, cost effective, easy-to-use and secure unit which a user is capable of making safe credit card payments with in stores, on Internet and person-to-person.

An important difference between the payment method describe above in the present invention and an ordinary Internet payment transaction is that the credit card, in this case the smart card, must be available on-line to the payment server during the whole payment process, thus making the payment process in the present invention much safer than an ordinary Internet payment transaction where the (physical) credit card does not need to be available at all (only the credit card information such as number and in some cases a code must be available).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A method of conducting electronic credit payments to a payment acquirer using a credit payment unit and a payment server, said credit payment unit comprising a smart card, a card reader device comprising electrical and physical interfaces required to fulfil EMV level 1 and a mobile phone, and said payment server comprising processing logic and data required to process a smart card application in order to perform an EMV transaction fulfilling EMV level 2, wherein said card reader device stores a reader serial number and said payment server stores a master reader key, said method comprising:
   initializing said credit payment unit wherein said initializing comprises:
      establishing, by said mobile phone, communication between said smart card and said card reader device, and
      establishing, by said mobile phone, communication between said card reader device and said mobile phone and
   initiating, by said mobile phone, a payment software
   said mobile phone setting up communication with the card reader device and establishing communication over the internet with the payment server via a wireless or wired link using said payment software;
   said card reader device communicating said reader serial number via said mobile phone to said payment server;
   said payment server deriving a reader key based on said communicated reader serial number and said master reader key;
   said card reader device reading smart card information from said smart card, and encrypting said smart card information using said reader key;
   communicating, using said mobile phone, said encrypted smart card information from said card reader device to said payment server;
   decrypting, by said payment server, said encrypted smart card information using said reader key;
   verifying, by said payment server, said smart card information;
   based on the verifying, said mobile phone receiving payment details and a user signature from a user;
   communicating, by said mobile phone, said payment details and said signature to said payment server; and
   communicating, by said payment server, said payment details to said payment acquirer.

2. The method according to claim 1, wherein said communication between said smart card and said card reader device is encrypted using said reader key in said card reader device.

3. The method according to claim 1, wherein said communication between said mobile phone and said payment server is encrypted using the Transport Layer Security protocol or the Secure Sockets Layer protocol.

4. The method according to claim 1, wherein said user signature is a graphical image of said user's signature entered on a display on said mobile phone.

5. The method according to claim 1, wherein said communicating of said payment details from said payment server to said payment acquirer is encrypted.

6. The method according to claim 1, further comprising:
   receiving, in said payment server, an acknowledgement from said payment acquirer that said electronic credit payment has been completed.

7. The method according to claim 1, further comprising:
   generating a receipt of said electronic credit payment in said payment server;
   communicating said receipt to said credit payment unit; and
   displaying said receipt in said mobile phone.

8. The method according to claim 7, further comprising:
   storing said receipt and said signature in a log.

9. A system conducting electronic credit payments to a payment acquirer, said system comprising:
   a credit payment unit; and
   a payment server;
   said credit payment unit in communication with said payment server for making electronic credit payments, said credit payment unit comprising:
      a smart card containing smart card information,
      a mobile phone;
      a card reader device comprising:
         a card reader processor;
         a card reader memory storing a unique reader serial number, a unique reader key, and card reader instructions; and
         electrical and physical interfaces required to fulfill EMV level 1;

said card reader instructions, when executed by said card reader processor, cause said card reader processor to perform the steps of:
  communicating the reader serial number to the payment server via said mobile phone;
  reading said smart card information from said smart card; and
  encrypting said smart card information using said reader key;
said mobile phone comprising:
  a mobile phone processor; and
  a mobile phone memory storing instructions that, when executed by said mobile phone processor, cause the mobile phone processor to perform the steps of:
    initializing said credit payment unit by establishing communication between said smart card and said card reader device, and establishing communication between said card reader device and said mobile phone and initiating a payment software in the mobile phone, said payment software setting up communication with the card reader device and also establishing communication with the payment server over the internet via a wireless or wired link;
    communicating said encrypted smart card information from said card reader device to said payment server;
    determining that the smart card information is verified by the payment server; and
    based on said determining, receiving payment details and a user signature from a user;
    communicating said payment details and said signature to said payment server;
said payment server comprising:
  a payment server processor; and
  a payment server memory storing processing logic and data required to process a smart card application in order to perform an EMV transaction fulfilling EMV level 2, and a master reader key, said processing logic, when executed by said payment server processor, causes said payment server processor to perform the steps of:
    receiving, from said card reader device, via said mobile phone, the unique reader serial number;
    deriving the reader key based on said received reader serial number and said master reader key;
    receiving, from said mobile phone, said encrypted smart card information;
    decrypting said encrypted smart card information using said derived reader key;
    verifying said smart card information; and
    receiving said payment details and said user signature from said mobile phone.

10. The credit payment unit according to claim 9, wherein said mobile phone is adapted to receive a receipt from said payment server and to display said receipt on a display in said mobile phone.

11. The credit payment unit according to claim 9, wherein said mobile phone is adapted to receive said payment details via a touch sensitive display.

\* \* \* \* \*